United States Patent [19]

Uedaira et al.

[11] Patent Number: 4,587,041

[45] Date of Patent: May 6, 1986

[54] METHOD FOR MANUFACTURING DIELECTRIC METAL TITANATE

[75] Inventors: Satoru Uedaira; Hiroshi Yamanoi; Hidemasa Tamura, all of Kanagawa, Japan

[73] Assignee: Sony Corporation, Tokyo, Japan

[21] Appl. No.: 675,448

[22] Filed: Nov. 28, 1984

[30] Foreign Application Priority Data

Nov. 29, 1983 [JP] Japan ................................ 58-224844
Dec. 5, 1983 [JP] Japan ................................ 58-229721
Jul. 19, 1984 [JP] Japan ................................ 59-150430

[51] Int. Cl.$^4$ ......................... H01B 3/20; C01G 23/00
[52] U.S. Cl. ..................................... 252/572; 423/598; 361/311; 427/123; 427/126.1
[58] Field of Search ........................ 423/598; 252/572

[56] References Cited

U.S. PATENT DOCUMENTS 3,725,539 4/1973 Spangenberg ...................... 423/598
4,487,755 12/1984 Arendt ................................ 423/598

FOREIGN PATENT DOCUMENTS 64218 4/1983 Japan ................................ 423/598
545585 4/1977 U.S.S.R. ............................ 423/598

OTHER PUBLICATIONS

Tochitskii et al, "Sov. Phys. Crystallogr.", 25(5), Sep.-Oct. 1980, pp. 591-594.

Primary Examiner—Herbert T. Carter
Attorney, Agent, or Firm—Hill, Van Santen, Steadman & Simpson

[57] ABSTRACT

A method for manufacturing dielectric metal titanate $MTiO_3$ where M represents Ba and Sr is disclosed, which comprises the steps of preparing aqueous alkaline solution containing at least one metal salt selected from the group of barium and strontium and immersing metal titanium into the solution to form the metal titanate $MTiO_3$ where M is at least one of barium and strontium.

Further, there is disclosed a method for manufacturing dielectric metal titanate $MTiO_3$ where M represents Ba and/or Sr which comprises the steps of preparing aqueous solution containing at least one metal salt selected from the group of barium and strontium, forming a metal titanium layer on a substrate, and immersing the substrate with the metal titanium layer into the solution to convert the metal titanium layer into the dielectric metal titanate $MTiO_3$ where M is at least one of barium and strontium.

4 Claims, 27 Drawing Figures (X 30,000)

(X 30,000)

1μm

1μm

METHOD FOR MANUFACTURING DIELECTRIC METAL TITANATE

BACKGROUND OF THE INVENTION

1. Field of the Invention

The present invention relates to a method for manufacturing dielectric metal titanate, and especially, to a method by chemical treatment of metal titanium to form metal titanate which is suitable for dielectrics for use in electronic parts.

2. Description of the Prior Art

In accordance with rapid development of various kinds of electronic parts for miniaturizing and making electronic equipments light in weight, particularly a hybrid integrated circuit is strongly requested to be miniaturized, to be light in weight, to have high efficiency and to be used for high frequency, etc. The hybrid integrated circuit consists of a resistor (R), a capacitor (C), an inductance (L), a transistor (Tr) and so on. At present, the capacitor (C) and the inductance (L) are obstacles against miniaturizing and making the hybrid integrated circuit light in weight. If the hybrid integrated circuit can be formed usable for a high frequency, the inductance (L) becomes small but the capacitor (C) is left as a problem unsolved. In the prior art, a solid electrolytic capacitor, a thin film capacitor and so on used in the conventional hybrid integrated circuit are formed by forming a dense and anti-corrosive oxide film on metal such as Al, Ta and the like by anodic oxidation method and effectively using the dielectric property of oxide film made of $Al_2O_3$, $Ta_2O_5$.

If the dielectric constant of the oxide film is taken as $\epsilon$, its surface area as $S(cm^2)$ and its thickness as $d(cm)$, capacitance $C(\mu F)$ is given by the following equation.

$$C = 8.855 \times 10^{-8} \epsilon \cdot S/d$$

Accordingly, to make the capacitor small in size, the surface area S and the thickness d have a restriction and so, when it is tried to obtain a large capacitance by the same volume, it is necessary to make the dielectric constant $\epsilon$ large. The above $Al_2O_3$, $Ta_2O_5$ are the main materials practically used as oxide film which provides high dielectric constant $\epsilon$. As a complex oxide material which has higher dielectric constant $\epsilon$, there are known, for example, $BaTiO_3$, $SrTiO_3$, $Ba_{1-x}Sr_xTiO_3$ which is a complex material thereof. And, it has been tried to form thin films thereof by sputtering. However, according to this method, it is difficult to form a thin film which has a desired composition, thus, this previous method has not yet been put into practice.

OBJECTS AND SUMMARY OF THE INVENTION

It is an object of the present invention to provide an improved method for manufacturing dielectric metal titanate.

It is another object of the present invention to provide a method for manufacturing dielectric metal titanate suitable for use in capacitors.

It is a further object of the present invention to provide a method for manufacturing dielectric metal titanate directly on a metal titanium layer by chemical treatment.

It is a still further object of the present invention to provide a method for manufacturing dielectric metal titanate having uniform thickness and having fine grain structure.

It is a yet further object of the present invention to provide a method for manufacturing dielectric metal titanate which is solid solution of barium titanate and strontium titanate with arbitrary composition.

According to one aspect of the present invention, there is provided a method for manufacturing dielectric metal titanate $MTiO_3$ where M represents Ba and/or Sr comprising the steps of:

preparing aqueous alkaline solution containing at least one metal salt selected from the group of barium and strontium; and immersing metal titanium into said solution to form said metal titanate $MTiO_3$ where M is at least one of barium and strontium.

According to another aspect of the present invention, there is provided a method for manufacturing dielectric metal titanate $MTiO_3$ where M represents Ba and/or Sr comprising the steps of:

preparing aqueous alkaline solution containing at least one metal salt selected from the group of barium and strontium;

forming a metal titanium layer on a substrate; and immersing said substrate with said metal titanium layer into said solution to convert said metal titanium layer into said dielectric metal titanate $MTiO_3$ where M is at least one of barium and strontium.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1A:
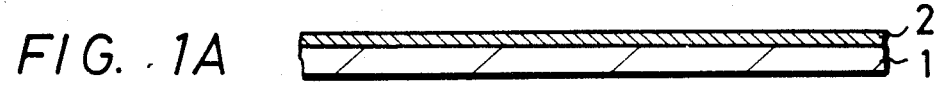
FIGS. 1A to 1H are respectively diagrams showing a method for manufacturing a capacitor to which the present invention is applied.

The present invention relates to a method for producing dielectric metal titanate by chemically treating metal titanium.

The metal titanate obtained in the present invention is generally expressed as $MTiO_3$ where M is a single substance of barium and/or strontium or mixture thereof.

The chemical treatment is carried out such that metal titanium is immersed into strong aqueous alkaline solution containing Ba ion and/or Sr ion more than a predetermined concentration.

The chemical treatment condition is changed in accordance with a case for obtaining a desired metal titanate as will be described later. In the present invention, it is possible to convert the whole of a metal titanate thin film into metal titanate or to convert only the surface portion of this thin film into the metal titanate so as to form a complex material of metal titanium and metal titanate.

When to form a $BaTiO_3$ film, although the chemical treatment condition is determined by both $Ba^{2+}$ concentration and pH of aqueous solution as shown by examples which will be mentioned later, $Ba^{2+}$ concentration must be not less than 0.1 mol/l and the pH must be not less than 12.2. $Ba^{2+}$ is obtained from soluble Ba salt such as $BaCl_2$, $Ba(NO_3)_2$, $BA(CH_3COO)_2$, $Ba(OH)_2.8H_2O$ and the like. Further, it is sufficient that the chemical treatment temperature is more than 20° C. and the chemical treatment time is not lower than 20 seconds.

When to form $SrTiO_3$ film, the $Sr^{2+}$ concentration in the chemical treatment solution must be not less than 0.1 mol/l as shown by examples which will be mentioned later. The pH value of the chemical treatment solution must be not less than 13.0. $Sr^{2+}$ can be obtained from soluble Sr salt such as SrO, $SrCl_2$, $Sr(NO_3)_2$, $Sr(CH_3COO)_2$, $Sr(OH)_2$ $Sr(OH)_2.8H_2O$ and so on. Furthermore, it is sufficient that the chemical treatment temperature is not lower than 55° C. and the chemical treatment time is beyond one minute.

When to form a solid solution film of $Ba_{1-x}Sr_xTiO_3$, $Ba^{2+}$ concentration and $Sr^{2+}$ concentration in the chemical treatment solution each must be not less than 0.1 mol/l, respectively. Further, it is sufficient that the pH of the chemical treatment solution is not less than 12.5, the chemical treatment temperature is not lower than 55° C. and the chemical treatment time is beyond one minute. The $Ba^{2+}$ is obtained from soluble Ba salt such as $BaCl_2$, $Ba(NO_3)_2$, $Ba(CH_3COO)_2$, $Ba(OH)_2.8H_2O$ and so on. In addition, the $Sr^{2+}$ is obtained from soluble Sr salt such as SrO, $SrCl_2$, $Sr(NO_3)_2$, $Sr(CH_3COO)_2$, $Sr(OH)_2$, $Sr(OH)_2.8H_2O$ and the like.

According to this invention, the metal titanate was obtained by chemically treating metal titanium.

The metal titanate thus obtained is of a perovskite structure which is stable in composition and formed of dense grains.

According to the present invention, since it is possible to form the thin film of metal titanate having high dielectric constant and stable in composition, the capacitor can be formed so as to be light in weight, to be small in size and to have a large capacity. Further, it becomes possible that a capacitor of large capacity can be incorporated integrally in an integrated circuit (IC), a large-scaled integration circuit (LSI) and so on.

Furthermore, since the composition ratio of Sr and Ba can be controlled arbitrarily, it is possible to arbitrarily control Curie temperature and dielectric constant of the dielectric material thus made.

Figure 1B:
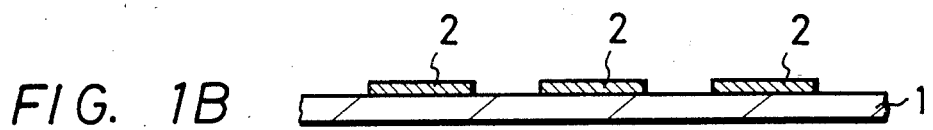
Figure 1C:
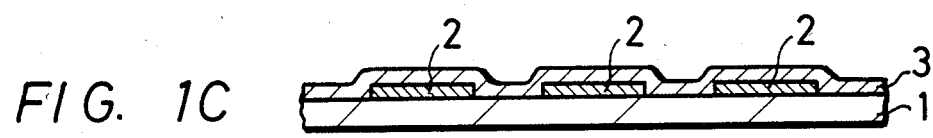
Figure 1D:
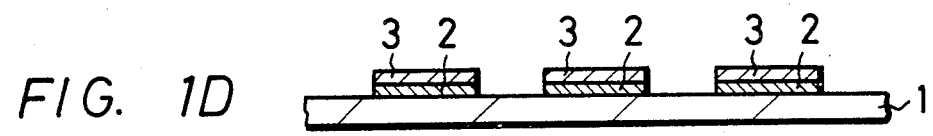
Figure 1E:
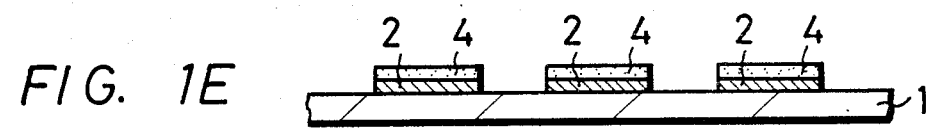
Figure 1F:
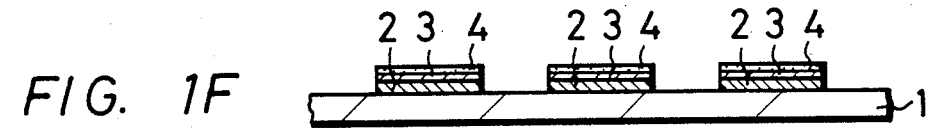
Figure 1G:
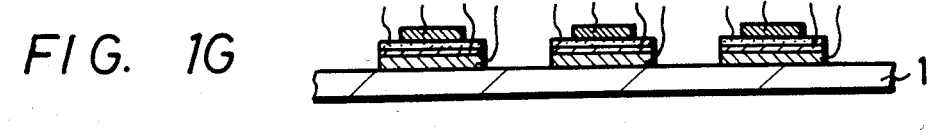
Figure 1H:
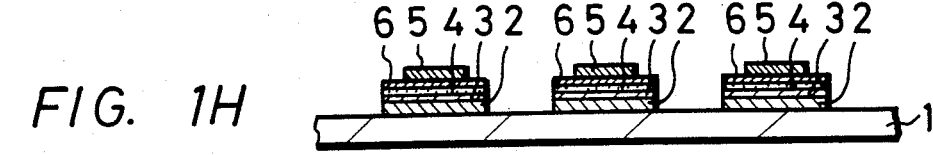

As the metal titanium layer, it is possible to use such one which is obtained, for example, as follows. By way of example, as shown in FIG. 1A, an Au layer 2 is formed on a substrate 1 such as ceramic substrate or glass substrate of various kinds by vacuum evaporation, sputtering and the like. Then, as shown in FIG. 1B, photo-resist (for example, trade name OMR-83, manufactured by Tokyo Ohyo Kagaku Kabushiki Kaisha) is used as a mask and then the Au layer 2 is immersed into solution ethcant (made of 2g of ammonium iodide, 0.3g of iodine, 10 ml of alcohol and 15 ml of water), and partially etched and removed. The substrate as shown in FIG. 1B is formed such that Au paste is screen-printed on the substrate 1 with a desired pattern and then subjected to heat treatment or that the Au paste is formed on the substrate 1 by mask vacuum evaporation, mask sputtering and like. Thereafter, as shown in FIG. 1C, a metal titanium layer 3 is deposited on this substrate 1 by vacuum evaporation, sputtering and the like. Then, as shown in FIG. 1D, the photoresist is used as an etching mask to carry out the etching treatment to remove other metal titanium layer 3 than those of the Au layer 2, thus the metal titanium layer 3 used in the present invention being produced. Further, it is possible to directly obtain the metal titanium layer 3 thus made by mask-evaporation method, mask-sputtering method and the like. When the metal titanium layer 3 thus made is used to make a capacitor, the substrate 1 as shown in FIG. 1D is first subjected to the chemical treatment with the result that the whole of the metal titanium layer 3 is converted to metal titanate ($MTiO_3$) layer 4 (shown in FIG. 1E or only the surface portion which is a part of the metal titanium layer 3 is converted to the metal titanate ($MTiO_3$) layer 4 (FIG. 1F). Thereafter, as shown in FIG. 1G, an opposing Au electrode 5 is formed on the metal titanate ($MTiO_3$) layer 4. Further, as shown in FIG. 1H, an $MnO_2$ layer 6 can be formed on the metal titanate layer 4 as required.

Figure 9:
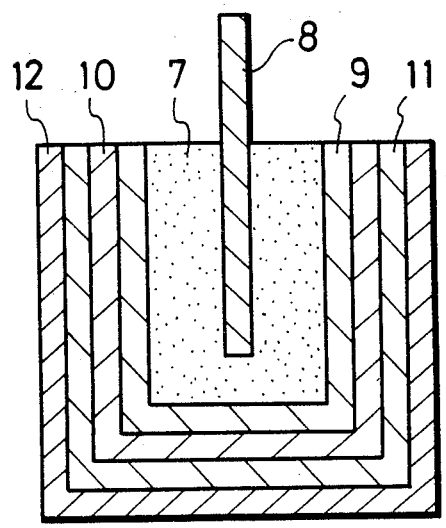
FIG. 9 is a cross-sectional view of a capacitor to which is applied the present invention.

Furthermore, it is possible to use such one that metal titanium powder 7 is partially sintered around a metal titanium rod 8 as shown in FIG. 9. When such sintered metal titanium powder 7 and so on are used to make a capacitor, the powder 7 thus sintered and the metal titanium rod 8 are subjected to the chemical treatment so as to form a metal titanate ($MTiO_3$) film. Then, an $MnO_2$ layer 9 is formed thereon if necessary. Then, after a carbon layer 10 is formed on the $MnO_2$ layer 9, an opposing electrode 11 is formed thereon. In FIG. 9, reference numeral 12 designates a casing.

Now, the present invention will hereinafter be described with reference to examples.

EXAMPLE 1

A metal titanium plate (50 mm×20 mm×0.3 mm) whose fat was removed by trichloroethylene was immersed into 4-$NHNO_3$ solution for several days as required and then rinsed by water. Thereafter, the surface layer of the metal titanium plate was etched in a mixed solution having a composition of HF: 15 vol %, $HNO_3$: 20 vol % and $H_2O$: 65 vol % at a room temperature for 30 to 60 seconds and then rinsed by water, thus the metal titanium plate subjected to pretreatment being prepared. Then, $Ba(NO_3)_2$ of 0.1 mol and KOH of 1 mol were dissolved into 1000 cc of water, stirred and raised in temperature to 100° C. Thereafter, the metal titanium plate which was subjected to the pre-treatment was immersed in the solution for 30 minutes, thus the chemical treatment was carried out for the metal titanium plate.

Figure 2:
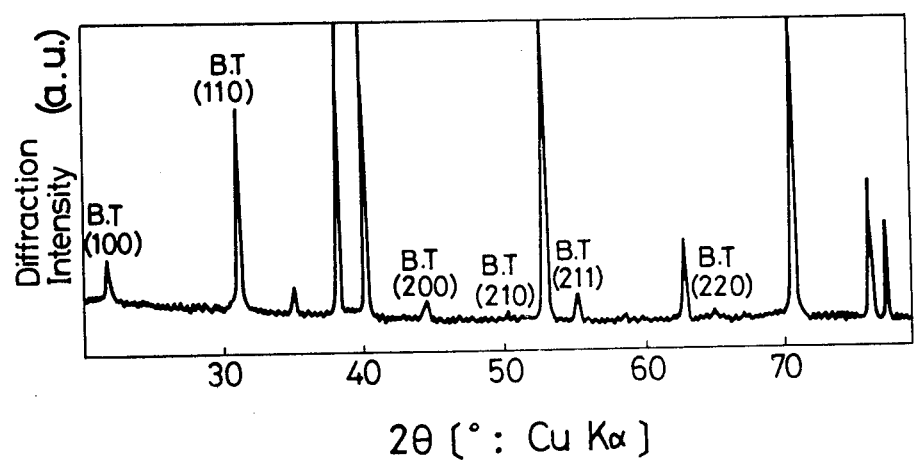
FIG. 2 is a diagram showing an X-ray diffraction pattern of $BaTiO_3$ film chemically made by the present invention.

The film on the surface portion of the metal titanium plate made by the above treatments was analyzed by the X-ray diffraction (copper target and nickel filter) analysis and the analyzed results were indicated on FIG. 2 and Table 1. From the X-ray diffraction chart, it could be confirmed that since each diffraction peak thereof is not split, this film was $BaTiO_3$ of cubic-system perovskite structure. Indicated on Table 1 are values of $BaTiO_3$ of tetragonal system in accordance with ASTM card 5-0626 for reference, in which $a_0=3.994$ Å and $C_O=4.038$ Å. A stable phase of $BaTiO_3$ at the room temperature is tetragonal system and transferred to cubic system at a temperature exceeding 120° C. The $BaTiO_3$ obtained by the aqueous solution chemical treatment of the present invention is the cubicsystem and the cause thereof may be considered to depend on the fact that the grain diameter is small, but the clear reason is still unknown.

TABLE 1

| Measured results | | | | $BaTiO_3$ (ASTM5-0626) | |
|---|---|---|---|---|---|
| $2\theta$ | d (Å) | h k l | a (Å) | d | h k l |
| 22.14 | 4.011 | 100 | 4.011 | 4.03 | 001 |
|  |  |  |  | 3.99 | 100 |
| 31.45 | 2.842 | 110 | 4.019 | 2.838 | 101 |
|  |  |  |  | 2.825 | 110 |
| Disappeared to Ti(002) |  | 111 |  | 2.314 | 111 |
| 45.04 | 2.011 | 200 | 4.022 | 2.019 | 002 |
|  |  |  |  | 1.997 | 200 |
| 50.61 | 1.802 | 210 | 4.029 | 1.802 | 102 |
|  |  |  |  | 1.790 | 201 |
| 55.84 | 1.645 | 211 | 4.029 | 1.642 | 112 |
|  |  |  |  | 1.634 | 211 |
| 65.39 | 1.426 | 220 | 4.033 | 1.419 | 202 |
|  |  |  |  | 1.412 | 220 |
| 69.80 | 1.346 | 300 | 4.038 | 1.337 | 212 |
|  |  | 321 |  | 1.332 | 221 |

In this case, regarding the {200}, the slit was made narrow and the sensitivity was raised slowly but it was not split Then, the results in which the film was subjected to reflection high energy electron diffraction are indicated on Table 2. On Table 2, reference numerals (1) and (2) designate films which were made through the chemical treatment carried out under the same condition as that of this Example. According to the X-ray diffraction, it is possible to detect the substance of the film made by the chemical treatment and having a thickness of about several decimal points μm. In this case, it was tried to confirm a substance having a thickness of about several hundreds angstroms near the surface of the film by the reflection high energy electron diffraction. The acceleration voltage was 100 KV and $\lambda \cdot L = 17.9$ mm Å.

From the reflection high energy electron diffraction pattern on Table 2, it was confirmed that the substance of the film thus chemically treated is cubic-system $BaTiO_3$.

TABLE 2

| (1) | | (2) | | $BaTiO_3$ (ASTM5-626) | | |
|---|---|---|---|---|---|---|
| r (mm) | d (Å) | r (mm) | d (Å) | d | $I/I_1$ | h k l |
|  |  | (4.41) | (4.06) | 4.03 | 12 | 001 |
|  |  |  |  | 3.99 | 25 | 100 |
| (6.33) | (2.83) | 6.29 | 2.85 | 2.838 | 100 | 101 |
|  |  |  |  | 2.825 |  | 110 |
|  |  | 7.69 | 2.33 | 2.314 | 46 | 111 |
| 8.98 | 1.99 | 8.90 | 2.01 | 2.019 | 12 | 002 |
|  |  |  |  | 1.997 | 37 | 200 |
| (9.83) | (1.82) |  |  | 1.802 | 6 | 102 |
|  |  |  |  | 1.790 | 8 | 201 |
| 10.97 | 1.63 | 10.92 | 1.64 | 1.642 | 15 | 112 |
|  |  |  |  | 1.634 | 35 | 211 |
|  |  | 12.63 | 1.42 | 1.419 | 12 | 202 |
|  |  |  |  | 1.412 | 10 | 220 |
|  |  | 14.06 | 1.27 | 1.275 | 5 | 103 |
|  |  |  |  | 1.264 | 7 | 301 |
|  |  | 14.77 | 1.21 | 1.214 | 3 | 113 |
|  |  |  |  | 1.205 | 5 | 311 |

Parenthesized values in Table 2 indicate substances whose strength is weak and which produces no accuracy.

Figure 4:
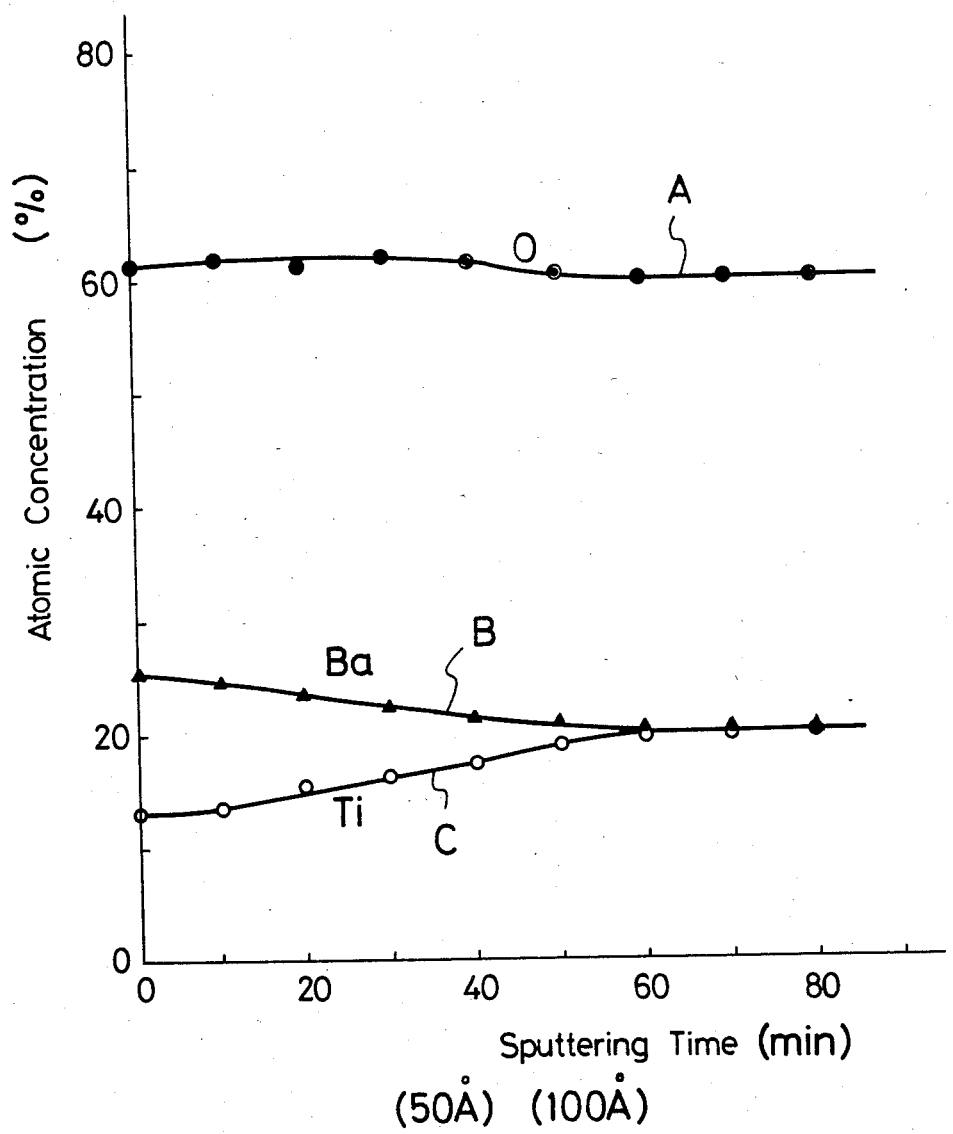
FIG. 4 is a graph showing a change of the composition of the above film in its depth direction.

FIG. 4 is a graph indicating the results in which the film was subjected to Auger electronspectroscopy and the composition of the film was analyzed. In FIG. 4, respective curves A, B and C indicate changes of compositions in the depth direction from the surface regarding O, Ba and Ti.

It was confirmed that the film chemically formed on the metal titanium plate by this Example was $BaTiO_3$ in view of composition.

EXAMPLE 2

Figure 5:
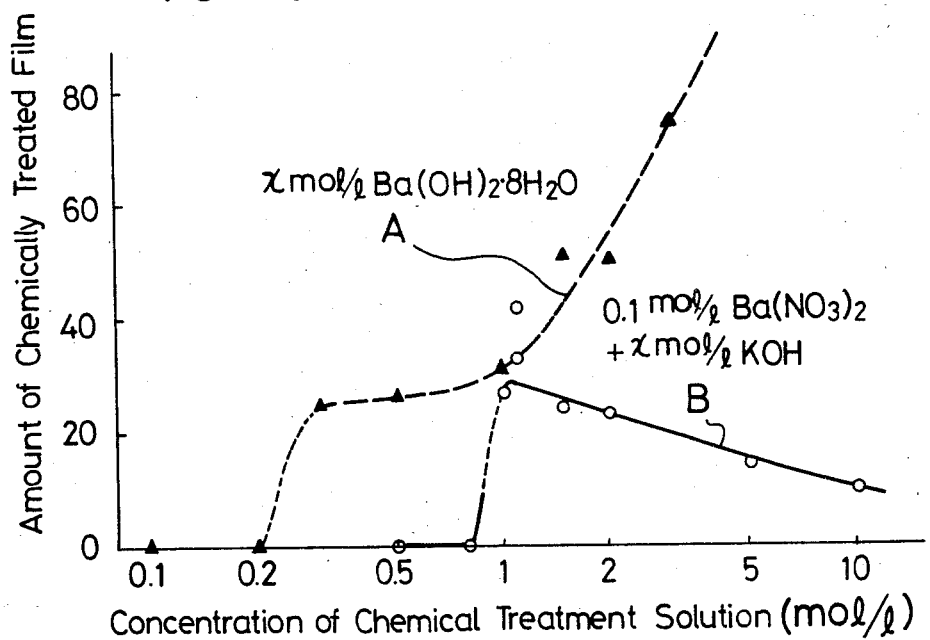
FIG. 5 is a characteristic graph showing the dependence of the film forming amount on a chemical treatment solution concentration.

Firstly, metal titanium plates which were subjected to pre-treatment similarly to the Example 1 were prepared. Then, this metal titanium plates were immersed into solutions in which the concentration of $Ba(OH)_2 \cdot 8H_2O$ in each solution was changed at 100° C. for thirty minutes and thus subjected to the chemical treatment. The measured results of the amount of the film thus made are shown by a curve A in FIG. 5. The amount of the film thus made was calculated from the diffraction peak area of {110} of X-ray diffraction chart of $BaTiO_3$ shown in FIG. 2. Next, the concentration of $Ba(NO_3)_2$ was selected to be 0.1 mol/l and the metal titanium plate which was subjected to the pre-treatment was immersed into the solution in which the concentration of the KOH was changed at 100° C. for thirty minutes and thus subjected to chemical treatment. A curve B in FIG. 5 shows the measured results of the amount of the film thus made. From FIG. 5, it was clear that the concentration of the single substance of $Ba(OH)_2$ is preferably selected to be 0.3 mol/l and as the concentration of $Ba(OH)_2$ is increased, the amount of the film thus made is increased. When there exists $Ba^{2+}$ having concentration of 0.1 mol/l, if the concentration of KOH is more than 0.8 mol/l, it is possible to obtain the chemically treated film. In this case, if the concentration of KOH exceeds 1.0 mol/l, the amount of the film thus made was decreased. When the concentration of $Ba^{2+}$ is below 0.1 mol/l, the chemically treated film could not be obtained even by changing the concentration of KOH. That is, $Ba^{2+}$ having the concentration of 0.1 mol/l and KOH having the concentration of 0.8 mol/l are the lower limits of the chemical treatment conditions.

Figure 7:
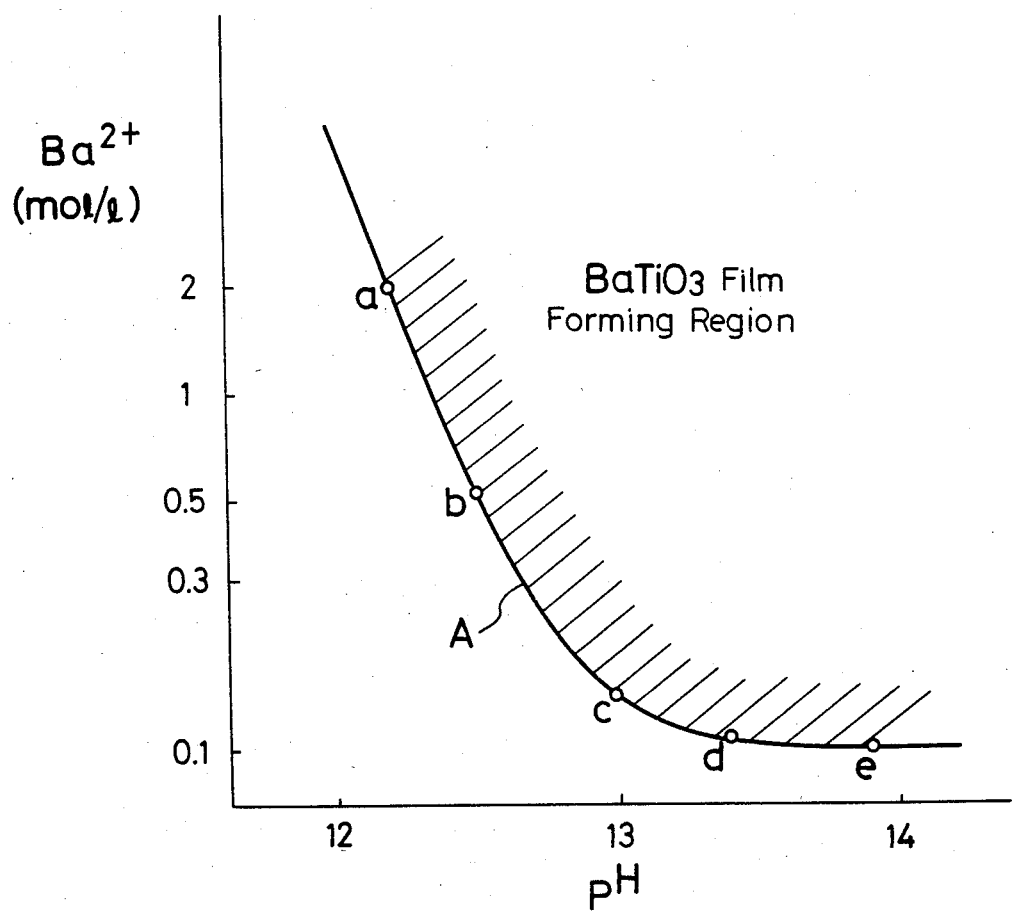
FIG. 7 is a characteristic graph showing a relation between a concentration of $Ba^{2+}$ and pH value which enable a film to be formed.

A curve A in FIG. 7 indicates the measured results of a relation between the concentration of $Ba^{2+}$ and pH which enable the $BaTiO_3$ film to be made. In the right-hand upper side region of the curve A made by connecting points a(12.2, 2.00), b(12.5, 0.25), c(13.0, 0.18) and d(13.9, 0.10), the $BaTiO_3$ film was made.

Figure 6:
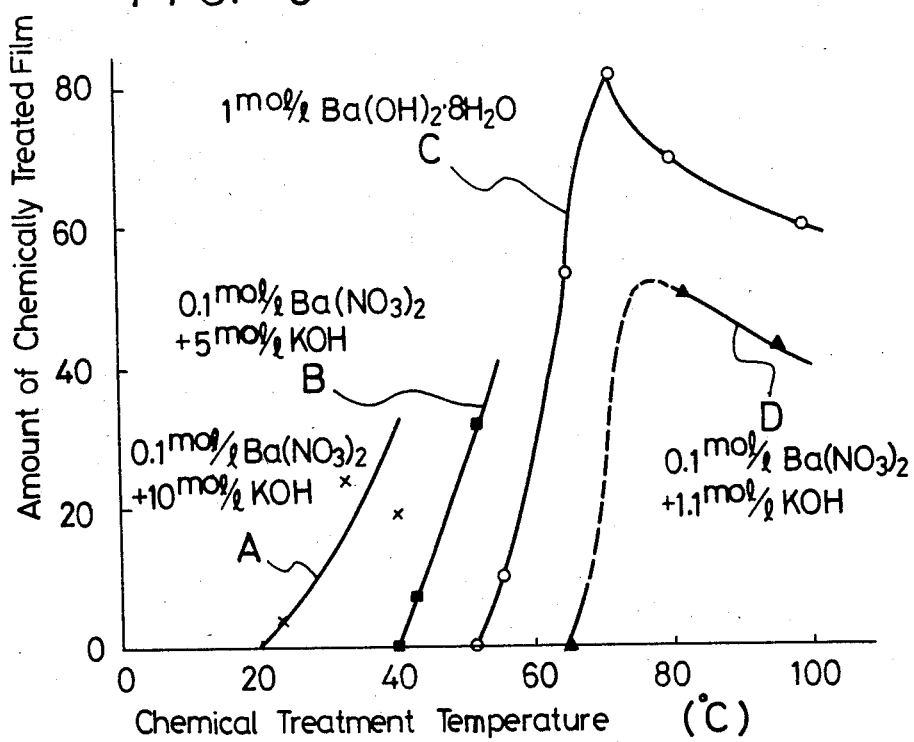
FIG. 6 is a characteristic graph showing the dependence of the film forming amount on a chemical treatment temperature.

FIG. 6 is a graph indicating the measured results of chemical treatment temperature dependence upon making the $BaTiO_3$ film. In the graph of FIG. 6, a curve A indicates the measured results in the case of the solution containing $Ba(NO_3)_2$ of 0.1 mol/l and KOH of 10 mol/l, a curve B indicates the measured results in the case of the solution containing $Ba(NO_3)_2$ of 0.1 mol/l and KOH of 5 mol/l, a curve C indicates the measured results in the case of the solution containing $Ba(OH)_2 \cdot 8H_2O$ of 1 mol/l and a curve D indicates the measured results in the case of the solution containing $Ba(NO_3)_2$ of 0.1 mol/l and KOH of 1.1 mol/l. As is clear from the graph of FIG. 6, until the chemical treatment temperature is 70° C., as the temperature rises, the amount of the film thus chemically made is increased, while when the temperature exceeds 70° C., the amount of the film thus made is decreased.

Figure 8:
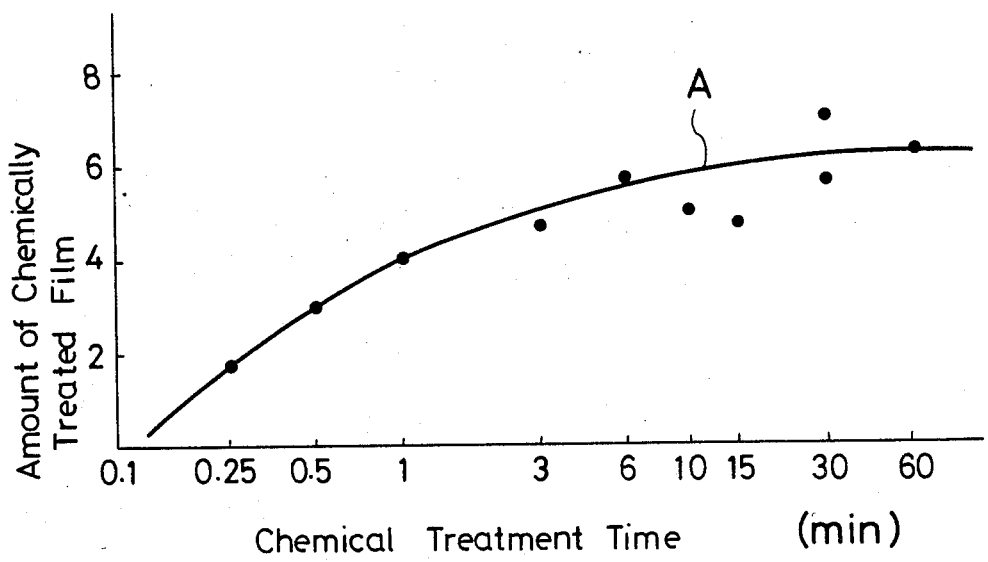
FIG. 8 is a characteristic graph showing the dependence of the film forming amount on a chemical treatment time.

The measured result of the chemical treatment time dependence of the $BaTiO_3$ film is shown by a curve A in the graph of FIG. 8. In this case, the $BaTiO_3$ film was made in the solution of $Ba(OH)_2 \cdot 8H_2O$ of 0.5 mol/l and at the temperature of 100° C. As is clear from the graph of FIG. 8, the amount of the $BaTiO_3$ film thus made is increased as the chemical treatment time increases but is gradually saturated.

Figure 3:
FIG. 3 is a photograph of the film made as above shot by a scanning electron microscope.

FIG. 3 is a photograph of the $BaTiO_3$ film chemically made in the $Ba(OH)_2 \cdot 8H_2O$ solution of 1 mol/l. shot by a scanning electron microscope. This photograph is shot under the condition that the under portion having scratches is inclined by 60°. From this photograph, it is clear that the film was formed to the bottom of the scratches. Also, this $BaTiO_3$ film is made of ball-like grains having a diameter of 1000 to 1500 Å.

EXAMPLE 3

Figure 10:
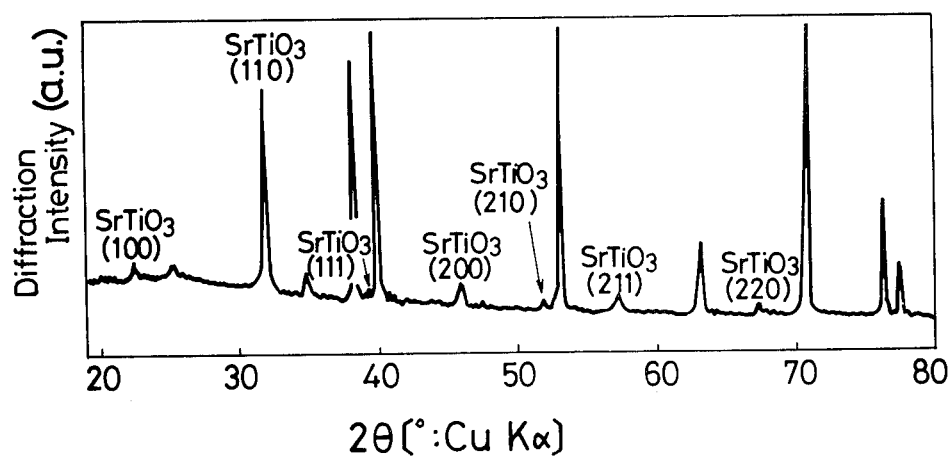
FIG. 10 is a diagram showing an X-ray diffraction pattern of $SrTiO_3$ chemically made by the present invention.
Figure 11:
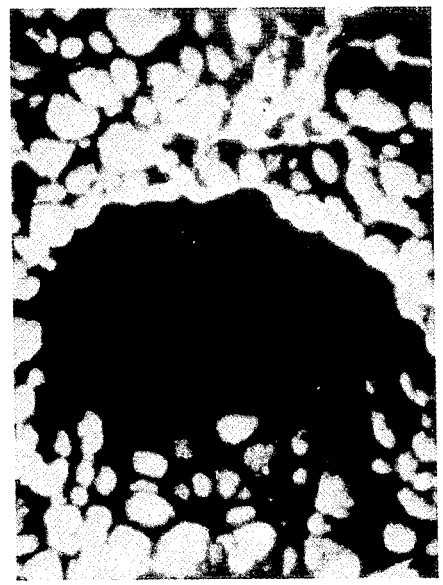
FIG. 11 is a photograph of the $SrTiO_3$ shot by a scanning electron microscope.

A metal titanium plate (50 mm×20 mm×0.3 mm) whose fat was removed by trichloroethylene was immersed into $4NHNO_3$ solution for several days as required and then rinsed by water. Thereafter, in a mixed solution containing HF:15 vol %, $HNO_3$:20 vol % and $H_2O$:65 vol %, the surface layer thereof was etched at room temperature for thirty to sixty seconds and then rinsed by water, thus the metal titanium plate subjected to the pre-treatment being prepared. Then, the metal titanium plate thus undergoing the pre-treatment was immersed into a solution containing $Sr(OH)_2 \cdot 8H_2O$ of 1.5 mol/l raised at 100° C. for thirty minutes to carry out the chemical treatment. FIG. 10 and Table 3 indicate the results in which the film on the surface of the metal titanium plate formed by the above treatment was analyzed by the X-ray diffraction (copper target and nickel filter). From this X-ray diffraction chart, since each diffraction peak is not split, it was confirmed that this film was $SrTiO_3$ of cubic-system of perovskite structure. Table 3 indicates values of $SrTiO_3$ according to the ASTM card 5-0634 for reference. The stable phase of $SrTiO_3$ is cubic-system.

TABLE 3

| Measured results | | | | $SrTiO_3$ (ASTM5-0634) | |
|---|---|---|---|---|---|
| $2\theta$ | d (Å) | h k l | a (Å) | d (Å) | h k l |
| 22.55 | 3.939 | 100 | 3.939 | 3.900 | 100 |
| 32.13 | 2.786 | 110 | 3.940 | 2.759 | 110 |
| 39.6 | 2.276 | 111 | 3.942 | 2.253 | 111 |
| 45.09 | 2.011 | 200 | 4.022 | 1.952 | 200 |
| 51.87 | 1.763 | 210 | 3.942 | 1.746 | 210 |
| 56.37 | 1.632 | 211 | 3.998 | 1.594 | 211 |
| 67.20 | 1.393 | 220 | 3.940 | 1.381 | 220 |
| 72.3 | 1.307 | 300 | 3.921 | 1.302 | 300 |

Table 4 shows the measured results in which the film was subjected to reflection high energy electron diffraction. Reference numerals (1) and (2) respectively designate films formed under the same conditions as those of this Example. According to the X-ray diffraction, it is possible to detect the substance of the film having a thickness of about several decimal points μm. In this case, it was tried to confirm the substance having a thickness of about several hundreds angstroms near the surface of the film by using the reflection high energy electron diffraction. The acceleration voltage was 100 KV and $\lambda \cdot L = 17.9$ mm Å.

From the reflection high energy electron diffraction pattern in Table 4, it could be confirmed that the substance of the film was cubic-system $SrTiO_3$.

TABLE 4

| (1) | | (2) | | $SrTiO_3$ (ASTM5-0634) | | |
|---|---|---|---|---|---|---|
| r (mm) | d (Å) | r (mm) | d (Å) | d | $I/I_1$ | h k l |
| 6.44 | 2.78 | | | 2.759 | 100 | 110 |
| 7.97 | 2.25 | (7.84) | (2.28) | 2.253 | 30 | 111 |
| 9.14 | 1.96 | (9.27) | (1.93) | 1.952 | 50 | 200 |
| 11.19 | 1.60 | 11.25 | 1.59 | 1.594 | 40 | 211 |
| 12.98 | 1.38 | 13.01 | 1.38 | 1.381 | 25 | 220 |
| | | (14.50) | (1.23) | 1.235 | 15 | 310 |
| | | 15.27 | 1.17 | 1.1774 | 5 | 311 |
| | | 15.94 | 1.12 | 1.1273 | 8 | 222 |
| | | 17.23 | 1.04 | 1.0437 | 16 | 321 |

Parenthesized values in Table 4 indicate substance whose strength is weak and which produce no accuracy.

Figure 12:
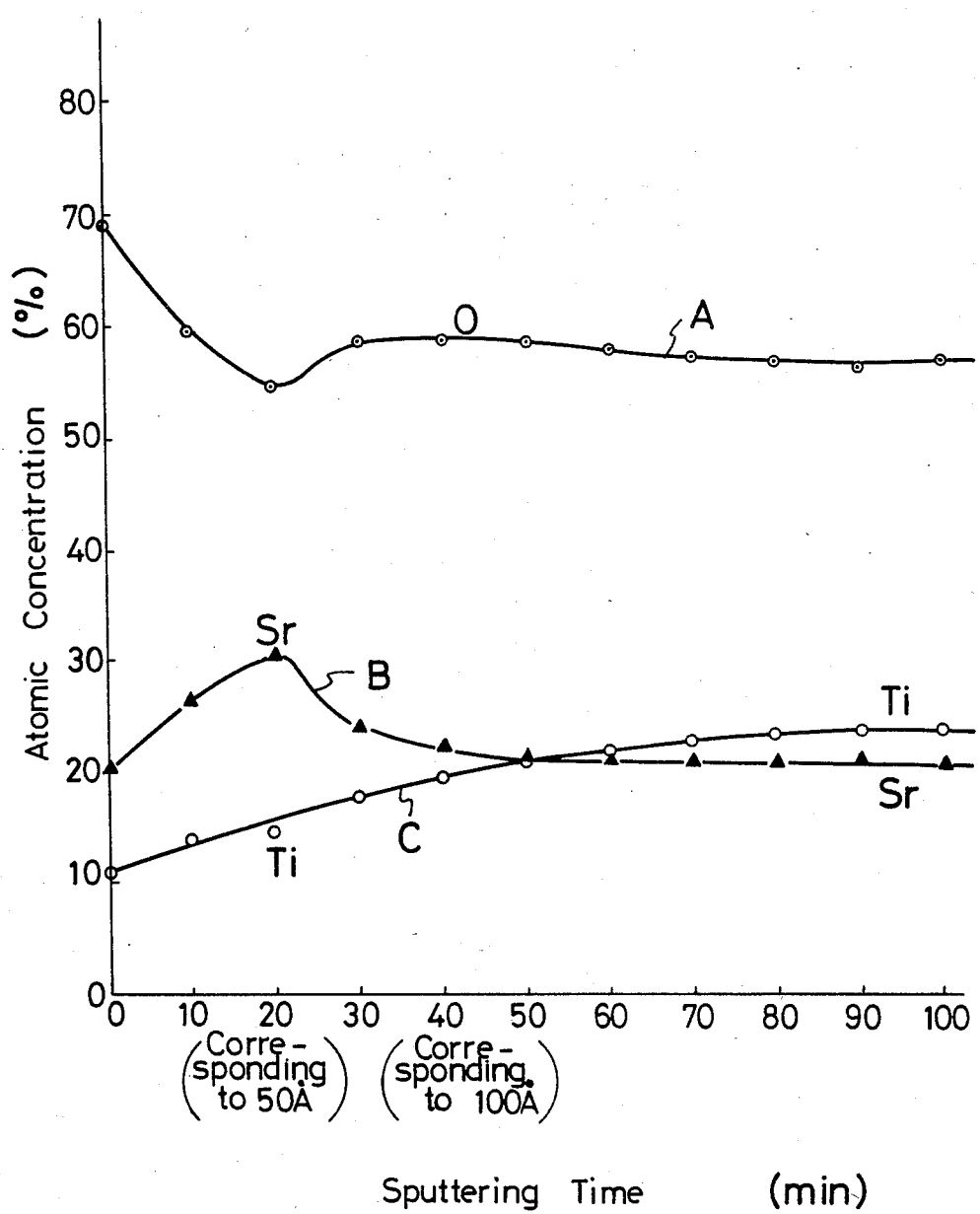
FIG. 12 is a graph showing results of Auger electron-spectroscopy.

FIG. 12 is a graph indicating the results in which the film was subjected to Auger electronspectroscopy and the composition of the film was analyzed. In FIG. 12, respective curves A, B and C indicate changes of compositions in the depth direction from the surface regarding O, Sr and Ti.

It was confirmed that the film chemically made on the metal titanium plate by this Example was $SrTiO_3$ in view of composition.

FIG. 4 is a photograph of the $SrTiO_3$ film formed in accordance with this Example shot by a scanning electron microscope. This photograph is shot under the condition that the portion having hole in the substrate is inclined by 45°. From this photograph, it is clear that the film was formed to the bottom of the scratches. Also, this $SrTiO_3$ film is made of ball-like grains having a diameter of 1000 to 3000 Å.

EXAMPLE 4

Figure 13:
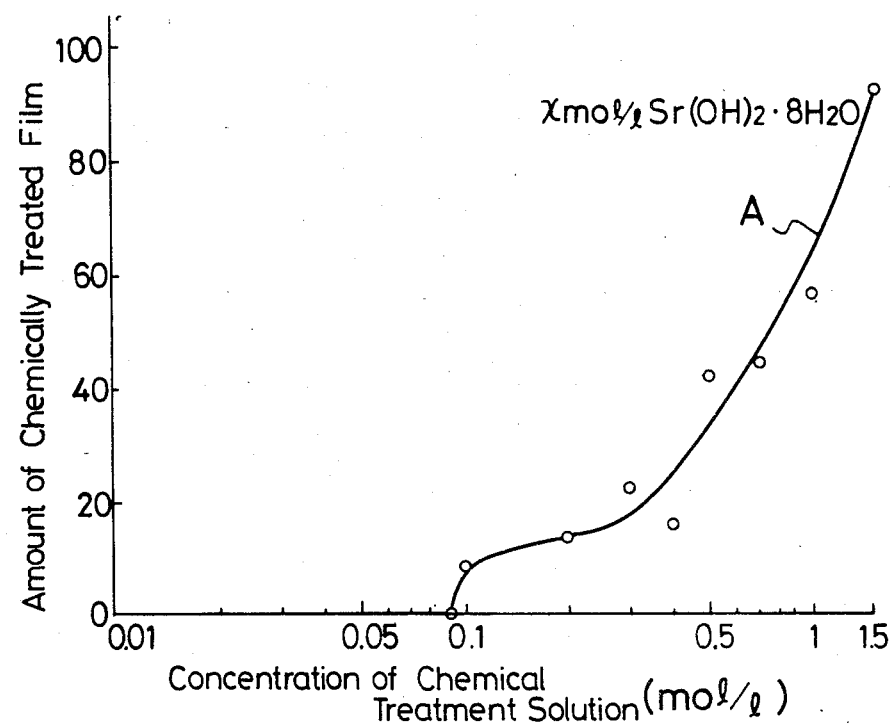
FIG. 13 is a characteristic graph showing the dependence of the film forming amount on a chemical treatment solution concentration.

Firstly, metal titanium plates which were subjected to pre-treatment similarly to the Example 3 were prepared. Then, each of this metal titanium plates was immersed into a solution each having different concentration of $Sr(OH)_2.8H_2O$ at 100° C. for thirty minutes to carry out the chemical treatment. The measured results of the amount of the film thus made are shown by a curve A in FIG. 13. The amount of the film thus made was calculated from the diffraction peak area of {110} of the X-ray diffraction chart of $SrTiO_3$ as shown in FIG. 10. From the graph of FIG. 13, it is clear that the chemical treatment reaction becomes possible if the concentration of $Sr(OH)_2.8H_2O$ is more than 0.09 mol/l. Practically, such concentration may be more than 0.1 mol/l and as the concentration is increased, the amount of the film thus made is increased. Further, the pH value of the $Sr(OH)_2.8H_2O$ having the concentration of 0.1 mol/l was 13.0.

Figure 14:
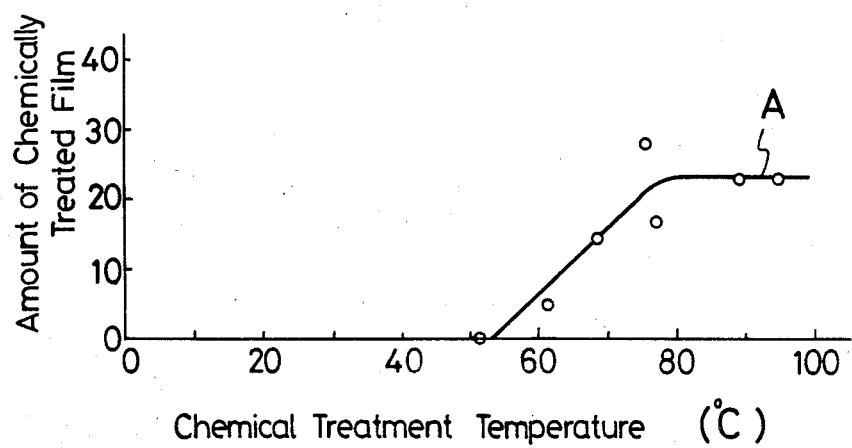
FIG. 14 is a characteristic graph showing the dependence of the film forming amount on a chemical treatment temperature.

A curve A in FIG. 14 shows the measured results of chemical treatment temperature dependence for chemically making the $SrTiO_3$ film in the solution of $Sr(OH)_2.8H_2O$ having the concentration of 0.3 mol/l. As will be clear from this graph of FIG. 14, the film can be formed at a temperature of 55° C. or above. Preferably, the temperature is selected to be more than 60° C. Up to about 80° C., as the temperature rises, the amount of the film thus formed is increased, while at the temperature exceeding 80° C., the amount of the film is saturated and becomes constant.

Figure 15:
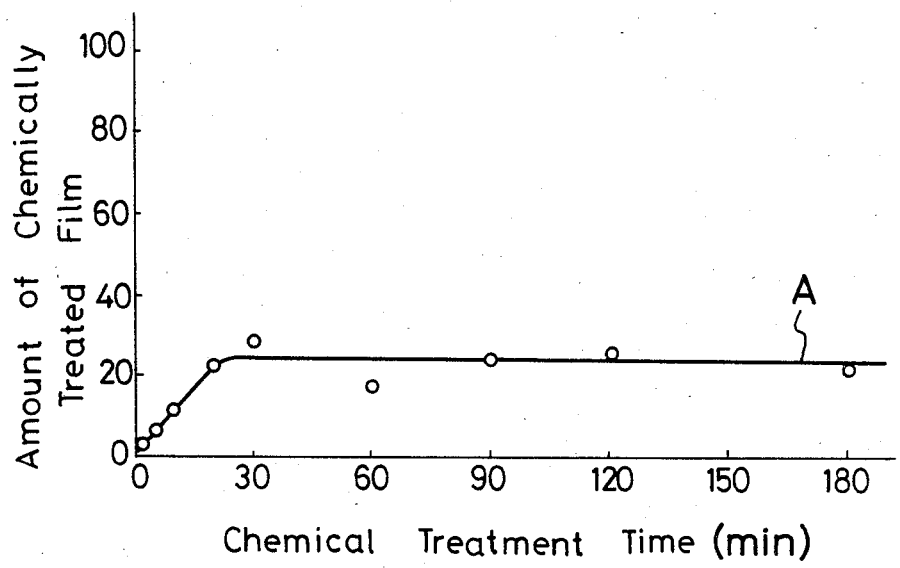
FIG. 15 is a characteristic graph showing the dependence of the film forming amount on a chemical treatment time.

The measured result of the chemical treatment time dependence for chemically making $SrTiO_3$ film is shown by a curve A in the graph of FIG. 15. In this case, the concentration of $Sr(OH)_2.8H_2O$ was 0.3 mol/l. As is clear from this graph, if the chemical treatment time is more than one minute, the film begins to be made. Properly, the chemical treatment time is more than several minutes and up to about 20 minutes, as time passes, the amount of the film formed is increased, while at time exceeding about 20 minutes, the amount of the film is saturated and becomes constant.

EXAMPLE 5

A metal titanium plate (50 mm×20 mm×0.3mm)whose fat was removed by trichloroethylene was immersed into the $4N-HNO_3$ solution and then rinsed by water. Thereafter, the surface layer thereof was etched in a mixed solution containing HF:15 vol %, $HNO_3$:20 vol % and $H_2O$:65 vol % at room temperature for thirty to sixty seconds and then rinsed by water, thus the metal titanium plate which was subjected to the pre-treatment being prepared. Then, 63.12 g of Ba-$(OH)_2. 8H_2O$ and 53.16 g of $Sr(OH)_2.8H_2O$ and pure water were mixed in a beaker of 200 cc so as to provide 200 cc of solution (each having the concentration of 1 mol/l). This solution was boiled and the metal titanium plate thus subjected to the pre-preatment was immersed into this boiled solution for 60 minutes to carry out the chemical treatment. Thereafter, this metal plate was rinsed by water to remove the solution and then dried.

Figure 16:
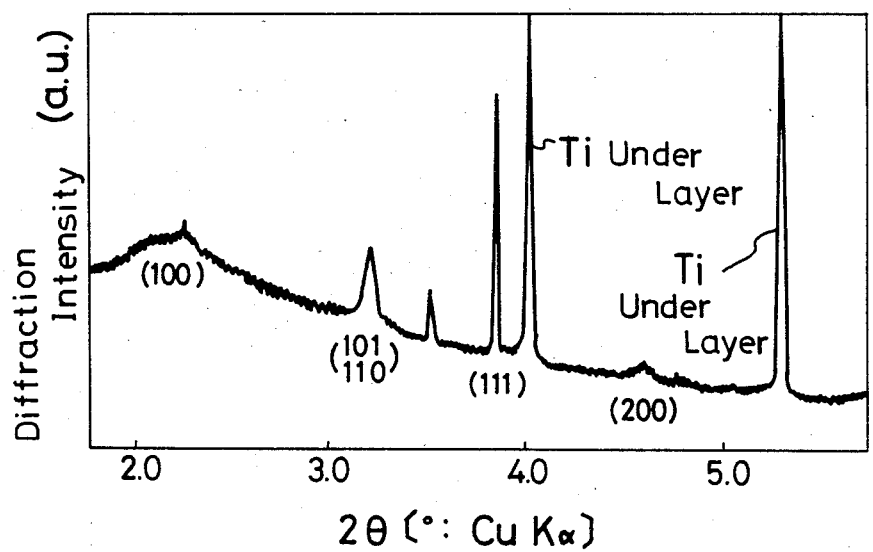
FIG. 16 is a diagram showing an X-ray diffraction pattern of a $Ba_{0.5}Sr_{0.5}TiO_3$ film chemically made by the manufacturing method of the present invention.

FIG. 16 shows the measured results in which the film formed on the surface portion of the metal titanium plate thus formed by the above treatment was analyzed by the X-ray diffraction (copper target and nickel filter). From this X-ray diffraction, since each diffraction peak is not split, it was confirmed that this film was cubic-system perovskite structure $Ba_{1-x}Sr_xTiO_3$. According to the fluorescent X-ray analysis, it was confirmed that Ba:Sr:Ti ratio of this film was 1:1:2 and this film was a $Ba_{0.5}Sr_{0.5}TiO_3$ film.

EXAMPLE 6

In order to obtain $Ba_{1-x}Sr_xTiO_3$ films having different Ba:Sr:Ti ratio, a metal titanium plate was immersed into 200 cc of solution containing $Ba(OH)_2.8H_2O$ and $Sr(OH)_2. 8H_2O$ having amounts indicated on left-hand side two columns of the following Table 5 to carry out the chemical treatment. When the films of these four kinds were subjected to the X-ray fluorescent spectroscopy, it was confirmed that $Ba_{1-x}Sr_xTiO_3$ films having Ba:Sr:Ti ratio expressed on the right-hand side of the Table 5 were formed.

TABLE 5

| | Amount of $Ba(OH)_2.8H_2O$ | Amount of $Sr(OH)_2.8H_2O$ | Ba:Sr:Ti |
|---|---|---|---|
| 1 | 100.96 g | 21.28 g | 4:1:5 |
| 2 | 84.12 g | 35.44 g | 2:1:3 |
| 3 | 42.04 g | 70.88 g | 1:2:3 |
| 4 | 25.24 g | 85.04 g | 1:4:5 |

Figure 17:
FIGS. 17 and 18 are photographs shot by the scanning electron microscope, illustrating the grain structure of a $Ba_{0.8}Sr_{0.2}TiO_3$ film, respectively.
Figure 18:

Two photographs of the $Ba_{0.8}Sr_{0.2}TiO_3$ film surface formed by the solution having the ratio of Ba/Sr=4 shot by the scanning electron microscope in which its angle was changed are shown on FIGS. 17 and 18. From these photographs, it is clear that the chemically treated films are formed uniform.

Figure 19:
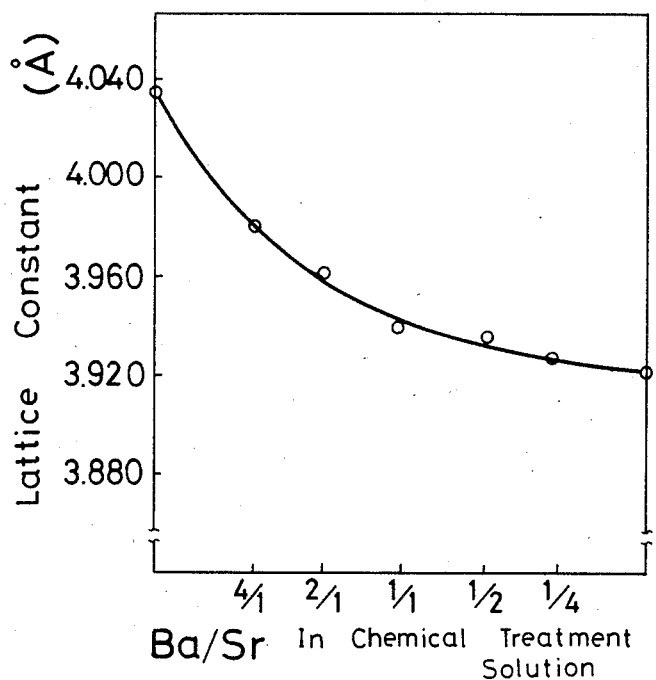
FIG. 19 is a graph showing measured results of lattice constant of a film chemically made by such a manner that Ba/Sr ratio in solution is being changed.
Figure 20:
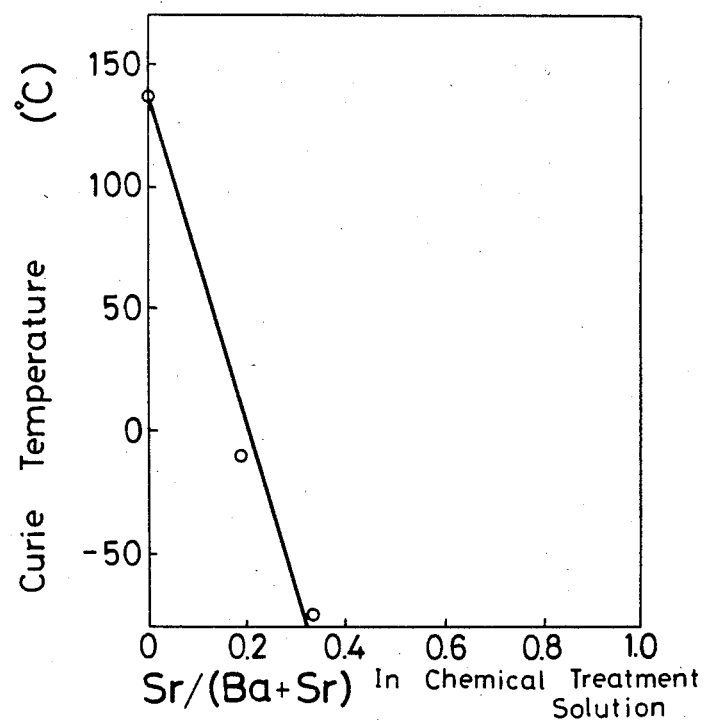
FIG. 20 is a graph showing measured results of Curie temperature Tc of a film chemically made by a manner that Sr/(Ba+Sr) ratio in the solution is being changed.

FIG. 19 is a graph showing the results in which while changing Ba/Sr ratio in the chemical treatment solution, the lattice constant of the films thus made was measured. While, FIG. 20 is a graph showing the measured results in which while changing Sr/(Ba+Sr) in the chemical treatment solution, Curie temperature of the films thus made was measured.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. Method for manufacturing dielectric metal titanate $MTiO_3$ where M represents Ba and/or Sr comprising the steps of:
    preparing an aqueous alkaline solution having a pH not lower than 12.2 and containing at least one salt of a metal selected from the group consisting of barium and strontium, said solution containing at least 0.1 mol/l of divalent barium or strontium ions, respectively; and
    immersing metal titanium into said solution at a temperature not less than 20° C. to form said metal titanate $MTiO_3$ where M is at least one of the metals barium and strontium.

2. Method for manufacturing dielectric metal titanate $MTiO_3$ where M represents Ba and/or Sr comprising the steps of:
    preparing aqueous alkaline solution having a pH not less than 12.2 and containing at least one salt of a metal selected from the group consisting of barium and strontium, said solution containing at least 0.1 mol/l of divalent barium or strontium ions, respectively;
    forming a metal titanium layer on a substrate; and immersing said substrate with said metal titanium layer into said solution at a temperature not less than 20° C. to convert said metal titanium layer into said dielectric metal titanate $MTiO_3$ where M is at least one of the metals barium and strontium.

3. Method according to claims 1 or 2, wherein said solution contains at least 0.1 mol/l of strontium salt and has a pH value not less than 13.0 and temperature not less than 55° C.

4. Method according to claim 2, wherein said metal titanium layer is partially converted into said metal titanate, thus forming a complex of metal titanium and metal titanate formed on the surface of said metal titanium.

* * * * *